United States Patent
Jacobs et al.

(10) Patent No.: US 11,204,504 B1
(45) Date of Patent: Dec. 21, 2021

(54) HEAD-MOUNTED DISPLAY ASSEMBLIES AND RELATED METHODS FOR INTERPUPILLARY DISTANCE ADJUSTMENTS

(71) Applicant: Facebook Technologies, LLC, Menlo Park, CA (US)

(72) Inventors: Joel Bernard Jacobs, Seattle, WA (US); Evan Lawrence Coons, Hayward, CA (US); Jeffrey Taylor Stellman, Seattle, WA (US); Mark Alan Tempel, Issaquah, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/914,988

(22) Filed: Jun. 29, 2020

Related U.S. Application Data

(60) Provisional application No. 62/993,394, filed on Mar. 23, 2020, provisional application No. 62/871,231, filed on Jul. 8, 2019.

(51) Int. Cl.
*G02B 27/01* (2006.01)
*G02B 30/26* (2020.01)

(52) U.S. Cl.
CPC ..... *G02B 27/0172* (2013.01); *G02B 27/0176* (2013.01); *G02B 30/26* (2020.01); *G02B 2027/0187* (2013.01)

(58) Field of Classification Search
CPC .............. G02B 27/017; G02B 27/0172; G02B 27/0176; G02B 30/26
See application file for complete search history.

(56) References Cited

U.S. PATENT DOCUMENTS

| | | | | |
|---|---|---|---|---|
| 2015/0234189 | A1* | 8/2015 | Lyons | G02B 27/0093 345/174 |
| 2016/0154241 | A1* | 6/2016 | Alhashim | A63F 13/24 345/8 |
| 2016/0210782 | A1* | 7/2016 | Thomas | G02B 27/017 |
| 2017/0352183 | A1* | 12/2017 | Katz | G06K 9/00255 |

* cited by examiner

*Primary Examiner* — Alexander Eisen
*Assistant Examiner* — Cory A Almeida
(74) *Attorney, Agent, or Firm* — FisherBroyles, LLP

(57) ABSTRACT

The disclosed head-mounted display assemblies may include a first eyecup and a second eyecup that are configured for positioning in front of intended locations of a user's eyes. The first eyecup and the second eyecup may be movable relative to each other to adjust for an interpupillary distance of the user's eyes. The head-mounted display assemblies may also include a single near-eye display screen configured for displaying an image to the user through the first eyecup and the second eyecup. A flexible shroud may be positioned to provide a seal between a first interior volume of the first eyecup, a second interior volume of the second eyecup, and the single near-eye display screen. Various other methods, devices, systems, and assemblies are also disclosed.

19 Claims, 12 Drawing Sheets

900

Position a first eyecup and a second eyecup over a single near-eye display screen, wherein the first eyecup and the second eyecup are positioned to move relative to each other to adjust for an interpupillary distance
910

↓

Couple an outer region of a flexible shroud to the single near-eye display screen
920

↓

Couple an inner region of the flexible shroud to the first eyecup and to the second eyecup to form a seal between a first interior volume of the first eyecup, a second interior volume of the second eyecup, and the single near-eye display screen
930

*FIG. 9*

```
┌─────────────────────────────────────────────────────────┐
│ Move a first eyecup and a second eyecup relative to each other and │
│         relative to a single near-eye display screen    │
│                         1010                            │
└─────────────────────────────────────────────────────────┘
                            │
                            ▼
┌─────────────────────────────────────────────────────────┐
│ Maintain a seal between a first interior volume of the first eyecup, a │
│ second interior volume of the second eyecup, and the single near- │
│           eye display with a flexible shroud            │
│                         1020                            │
└─────────────────────────────────────────────────────────┘
```

HEAD-MOUNTED DISPLAY ASSEMBLIES AND RELATED METHODS FOR INTERPUPILLARY DISTANCE ADJUSTMENTS

CROSS-REFERENCE TO RELATED APPLICATION

This application claims the benefit of U.S. Provisional Patent Application Ser. No. 62/871,231, titled "HEAD-MOUNTED DISPLAY ASSEMBLIES AND RELATED METHODS FOR INTERPUPILLARY DISTANCE ADJUSTMENTS," filed Jul. 8, 2019, and U.S. Provisional Patent Application Ser. No. 62/993,394, titled "HEAD-MOUNTED DISPLAY ASSEMBLIES AND RELATED METHODS FOR INTERPUPILLARY DISTANCE ADJUSTMENTS," filed Mar. 23, 2020, the entire disclosure of each of which is incorporated herein by reference.

BRIEF DESCRIPTION OF THE DRAWINGS

The accompanying drawings illustrate a number of example embodiments and are a part of the specification. Together with the following description, these drawings demonstrate and explain various principles of the present disclosure.

FIG. 9 is a flow diagram illustrating a method of fabricating a head-mounted display assembly, according to at least one embodiment of the present disclosure.

FIG. 10 is a flow diagram illustrating a method of adjusting an interpupillary distance of a head-mounted display assembly, according to at least one embodiment of the present disclosure.

Figure 1A:
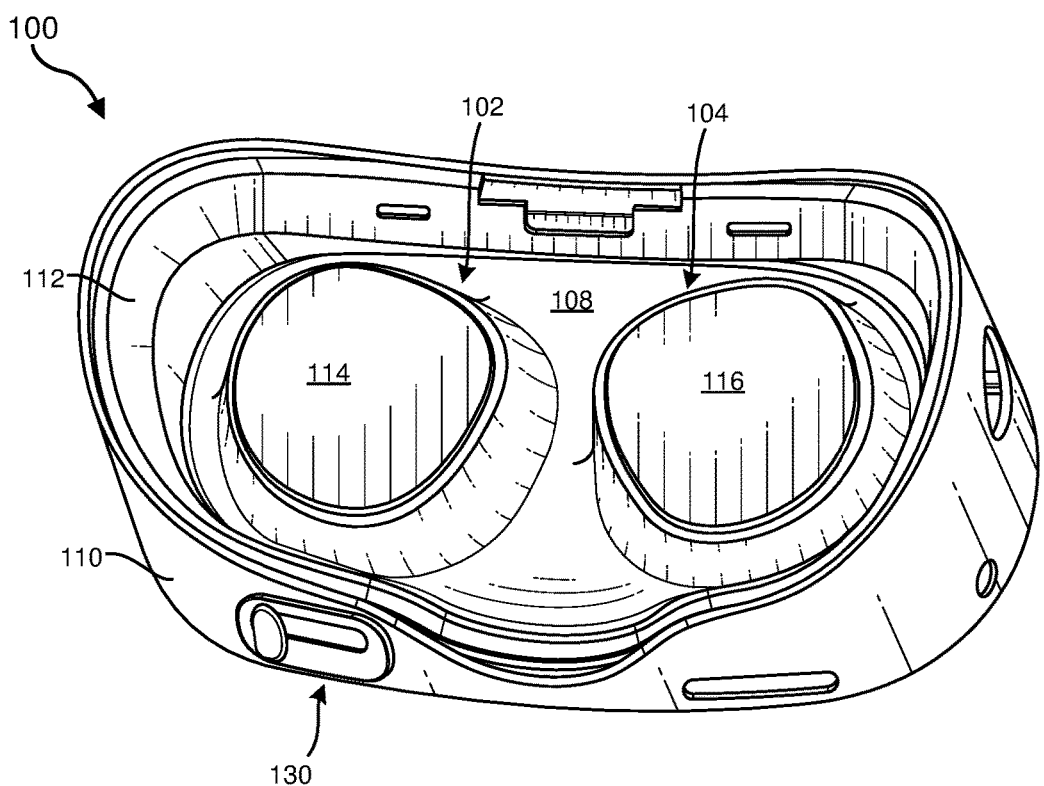
FIG. 1A is a perspective view and FIG. 1B is a cross-sectional side view of a head-mounted display assembly, according to at least one embodiment of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

Artificial-reality systems, such as virtual-reality systems or augmented-reality systems, typically display computer-generated content to users in order to create immersive experiences. The content may be displayed on a head-mounted display ("HMD") screen. For example, a virtual-reality system may create three-dimensional renderings to simulate an environment or a virtual space. Alternatively, augmented-reality systems may merge computer-generated content with a user's view of a real-world environment to enhance interactions with the real-world environment. These systems may provide users with the ability to navigate and alter digital content that may provide helpful information about real-world objects. HMD systems sometimes include two optical lenses—one for each eye—positioned in front of the screen. The lenses may magnify and/or provide an appropriate focus to images displayed on the screen. Contamination (e.g., dust particles, fingerprints, etc.) on the lenses or the screen can undesirably block or otherwise obscure portions of a displayed image.

Different users have different head and face shapes and sizes. For example, a particular user's eyes may be located closer or farther apart from each other, compared to other users. The distance between the center of an HMD user's pupils is commonly referred to as "interpupillary distance" or "IPD." Positioning the lenses to match a particular user's IPD improves picture quality for that user. To accommodate for different IPDs, some HMDs include a mechanism to adjust an IPD setting and, therefore, a relative position of the optical lenses. Some HMDs include two separate screens coupled to the two respective lenses. Each lens and screen pair may be movable relative to the other lens and screen pair to adjust for IPD. Each lens and screen pair may include a sealed interior to inhibit the introduction of contamination, to improve or maintain picture quality. However, two such screens are generally more expensive to integrate into HMDs compared to a single screen. However, conventional HMD systems with one screen and IPD adjustment capability generally have a configuration that may allow contamination to be introduced onto the screen and/or onto a screen side of the lenses.

The present disclosure is generally directed to HMD assemblies that may include a single near-eye display ("NED") screen and two eyecups that are movable relative to each other to adjust for IPDs of different users. A flexible shroud may be positioned to provide a seal between the eyecups and the single NED screen while also allowing for interpupillary adjustments. As will be explained in greater detail below, embodiments of the present disclosure may enable IPD adjustments over a single, sealed display screen. The single display screen may reduce a cost of HMD assemblies with IPD adjustability, compared to conventional HMD assemblies with two separate display screens. Single display screens may also result in HMD assemblies with less mechanical complexity, and therefore reduced risk of failure and a smaller mechanical volume. Electronic circuitry may also be simplified and may have improved reliability, since wires and other electrical components may not need to bend and/or move with a single display screen, as opposed to designs with movable display screens. Additionally, the sealing of the eyecups over the single display screen may facilitate keeping the screen clean and substantially free from contamination, which might otherwise obstruct a user's view of blocked pixels of the display screen.

Features from any of the embodiments described herein may be used in combination with one another in accordance with the general principles described herein. These and other embodiments, features, and advantages will be more fully understood upon reading the following detailed description in conjunction with the accompanying drawings and claims.

Figure 7:
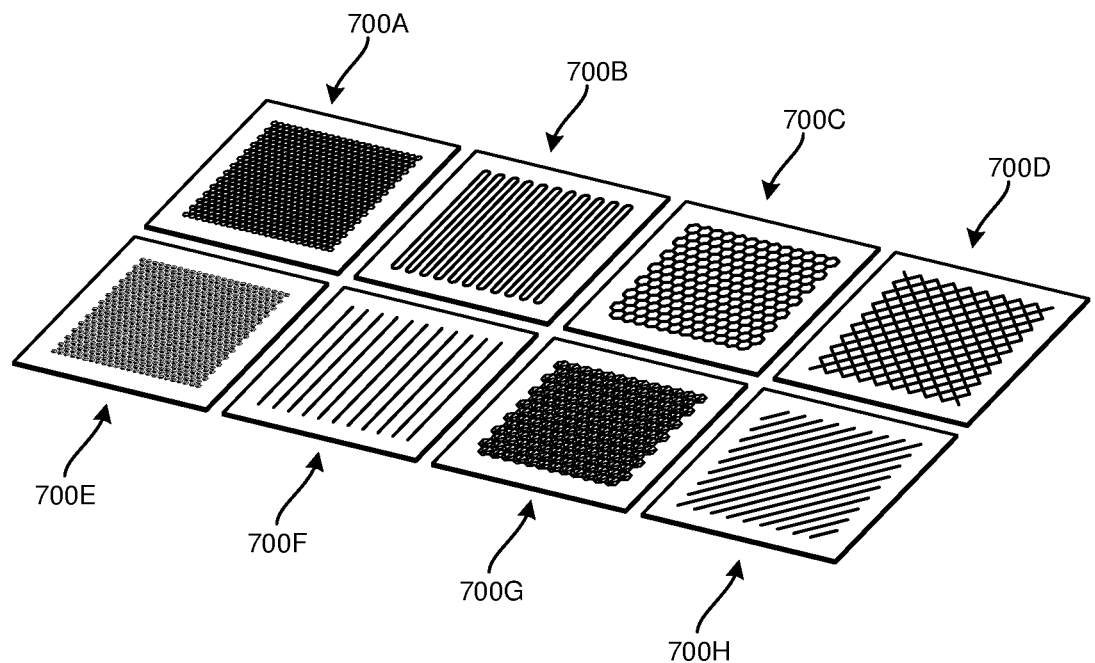
FIG. 7 is a perspective view of several textured material samples having an extensible shape for use in flexible shrouds of head-mounted display assemblies, according to various embodiments of the present disclosure.
Figure 8:
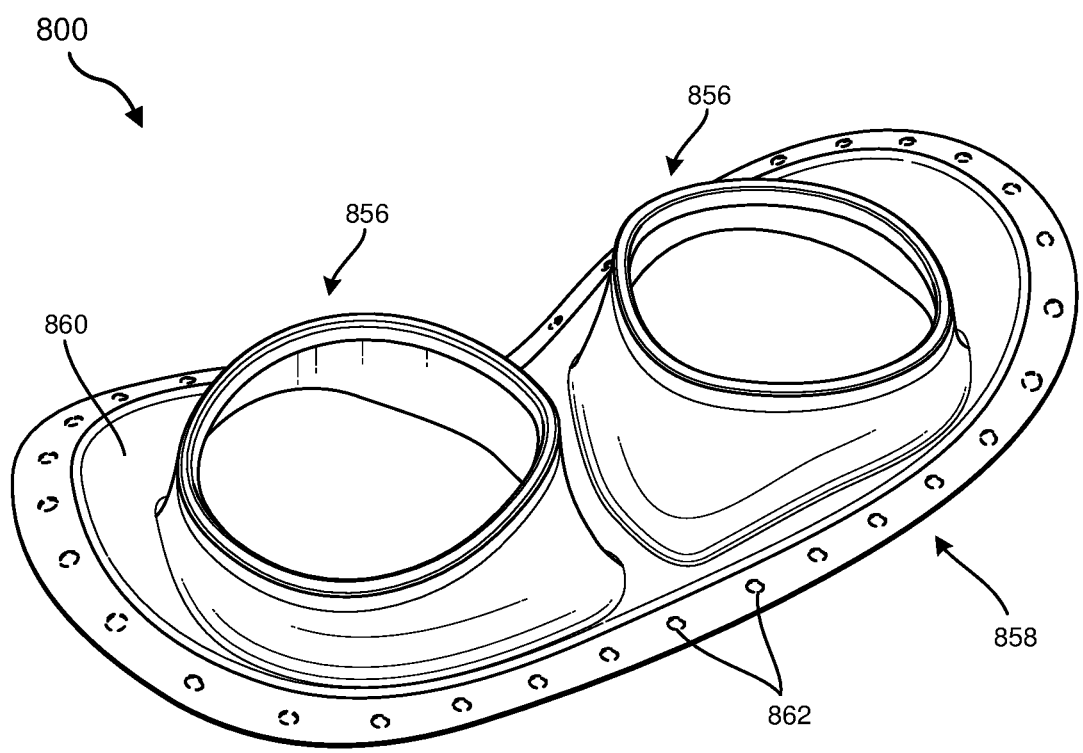
FIG. 8 is a perspective view of a flexible shroud for use in a head-mounted display assembly, according to at least one embodiment of the present disclosure.
Figure 11:
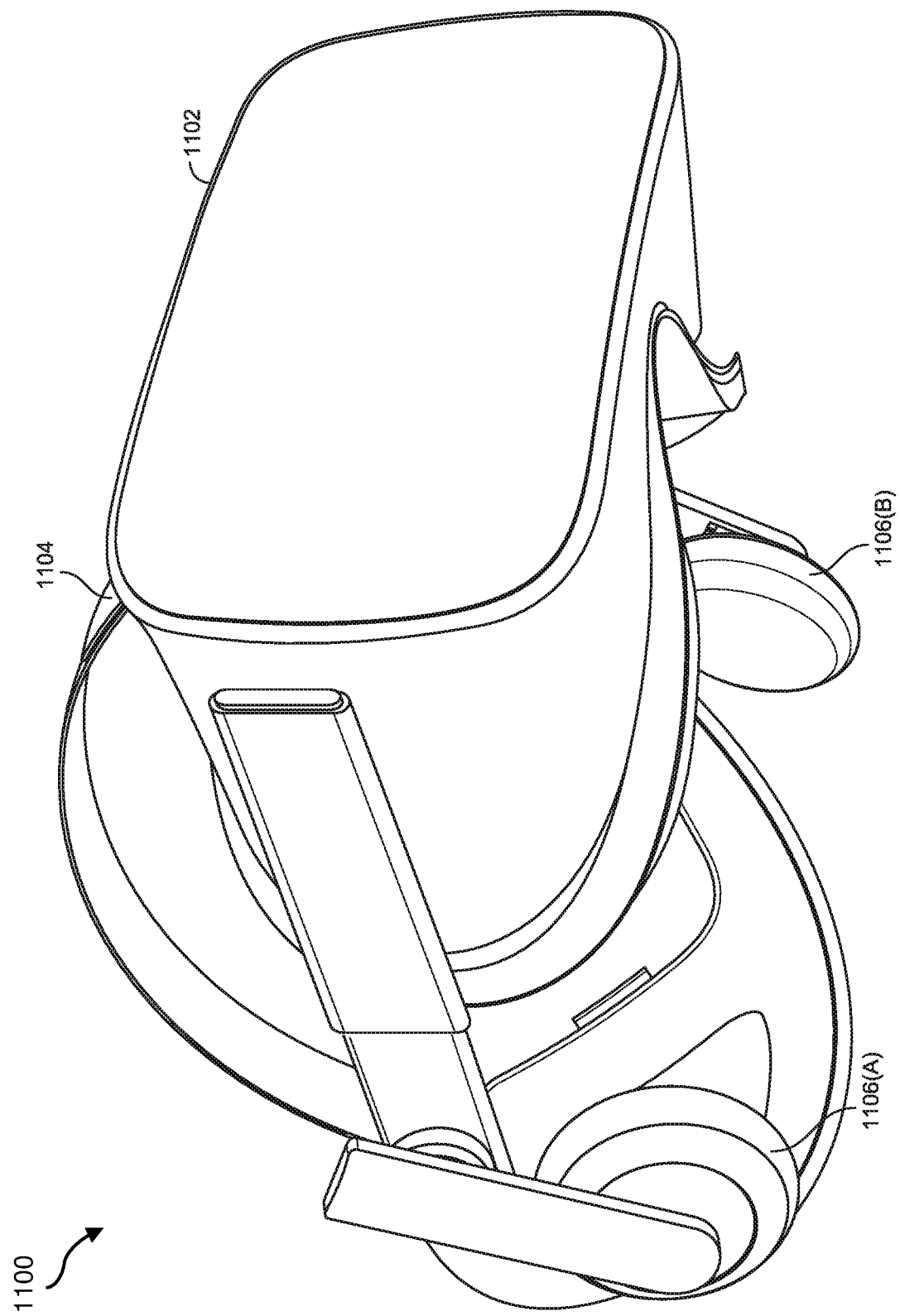
FIG. 11 is an illustration of an example virtual-reality headset that may be used in connection with embodiments of this disclosure.
Figure 12:
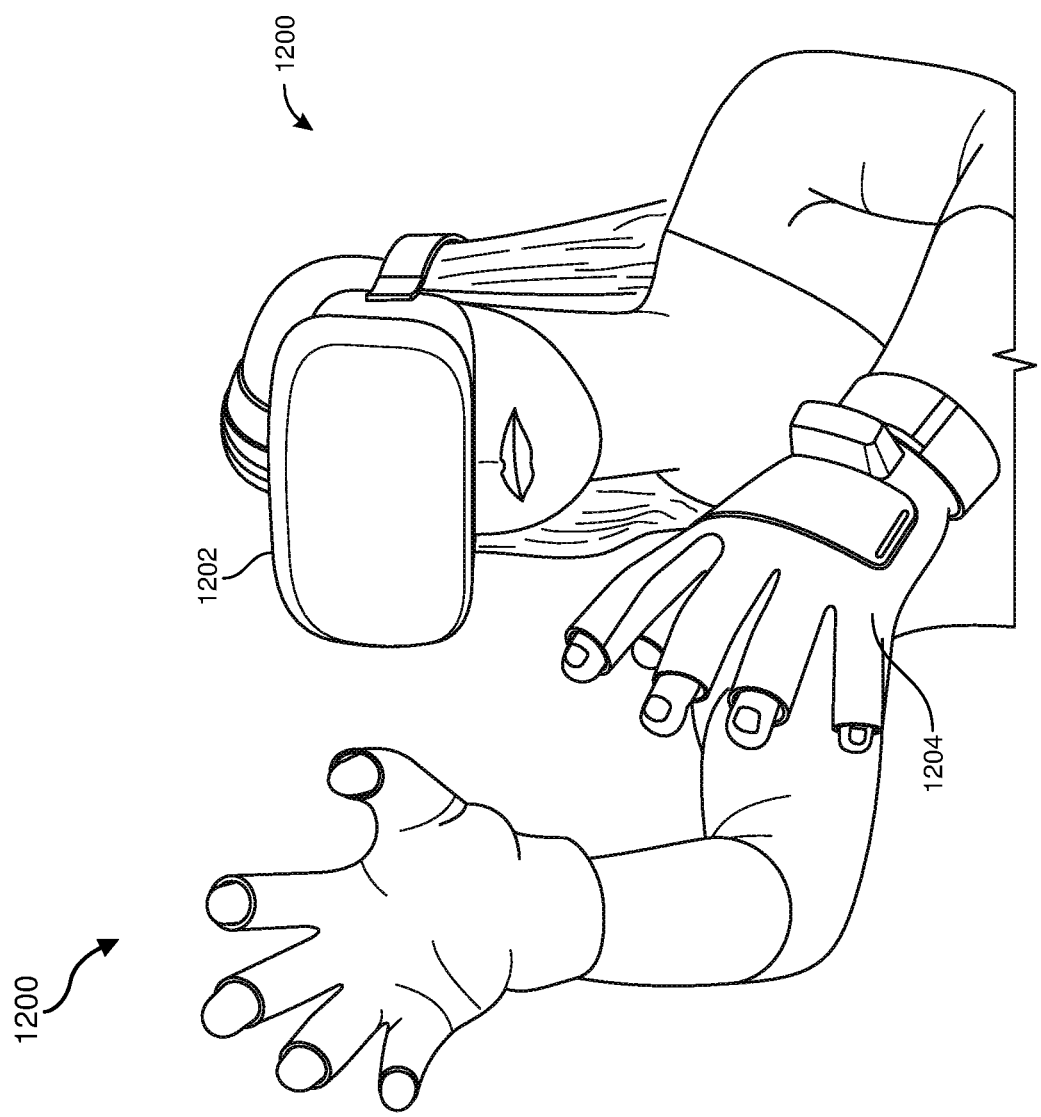
FIG. 12 is an illustration of an example virtual-reality environment according to embodiments of this disclosure.

The following will provide, with reference to FIGS. 1A-6, detailed descriptions of various example HMD assemblies according to the present disclosure. With reference to FIG. 7, the following will provide detailed descriptions of various example textured material samples, which may be used as a material for flexible shrouds of HMD assemblies of the present disclosure. With reference to FIG. 8, the following will provide detailed descriptions of an example flexible shroud that may be incorporated in HMD assemblies of the present disclosure. With reference to FIGS. 9 and 10, the following will provide detailed descriptions of example methods of fabricating HMD assemblies and of adjusting an IPD of HMD assemblies, respectively. With reference to FIGS. 11 and 12, the following will provide detailed descriptions of example artificial-reality systems and environments that may be used in conjunction with HMD assemblies of the present disclosure.

Figure 1B:
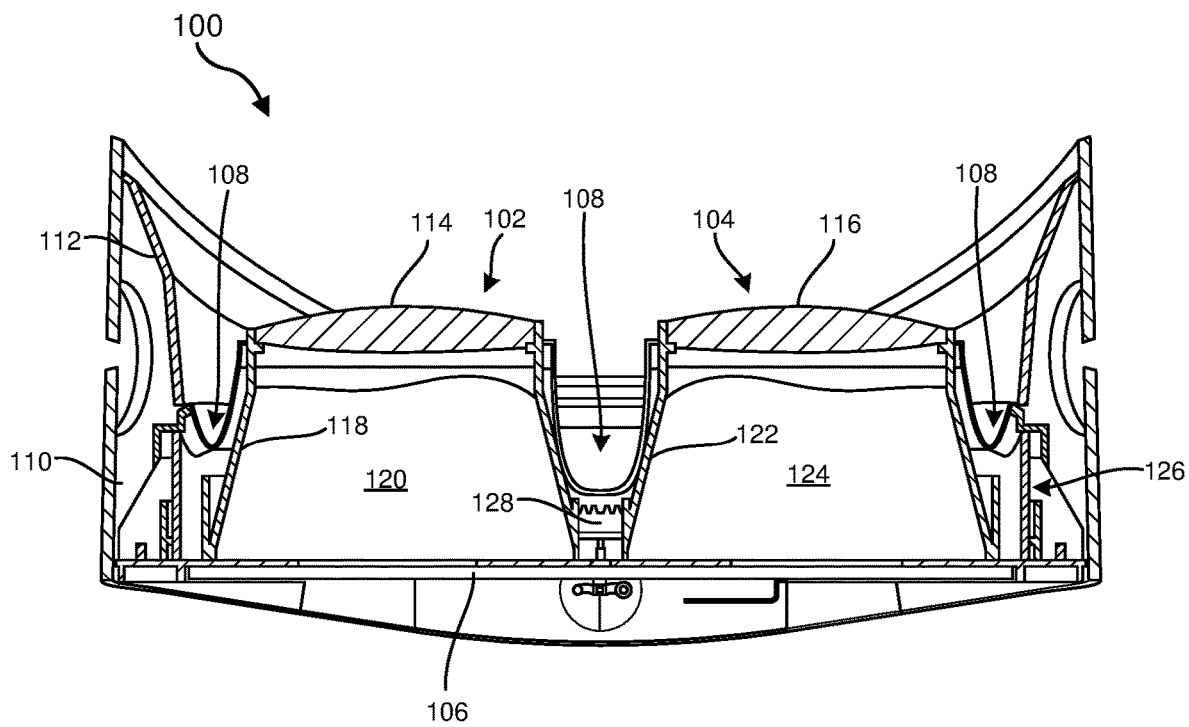

FIGS. 1A and 1B illustrate an HMD assembly 100 that may include a first eyecup 102 and a second eyecup 104 positioned over a single NED screen 106, with a flexible shroud 108 positioned over portions of the single NED screen 106 and over portions of the eyecups 102, 104. The eyecups 102, 104, single NED screen 106, and flexible shroud 108 may be mounted on an HMD support frame 110, which may also support an eye bracket 112 that may be shaped and positioned for resting against the user's face when the HMD assembly 100 is donned by the user.

In some examples, relational terms, such as "first," "second," "upper," "lower," "over," "underlying," etc., may be used for clarity and convenience in understanding the disclosure and accompanying drawings and may not necessarily connote or depend on any specific preference, orientation, or order, except where the context clearly indicates otherwise.

The eyecups 102, 104 may be configured for positioning in front of intended locations of a user's eyes when the HMD assembly 100 is donned by the user. For example, the first eyecup 102 may be configured for viewing the single NED screen 106 with the user's left eye and the second eyecup 104 may be configured for viewing the single NED screen 106 with the user's right eye. The first eyecup 102 may support a first optical lens 114 and the second eyecup 104 may support a second optical lens 116. For example, each of the optical lenses 114, 116 may be a corrective ophthalmic lens (e.g., a positive-optical power (i.e., magnifying) lens, a negative-optical power (i.e., diminishing) lens, a lens for correction of an aberration, etc.), a zero-power optical lens, an adjustable (e.g., deformable) optical lens, a Fresnel lens, or another optical lens element. Optionally, an anti-reflective coating may be applied to the optical lenses 114, 116.

The first eyecup 102 may include a first rigid housing 118 at least partially defining a first interior volume 120. Similarly, the second eyecup 104 may include a second rigid housing 122 at least partially defining a second interior volume 124. The flexible shroud 108 may be positioned to provide a seal (e.g., a hermetic seal) between the interior volumes 120, 124 of the eyecups 102, 104 and the single NED screen 106, such as for inhibiting (e.g., reducing or eliminating) the introduction of contamination (e.g., particles, dust, sand, lint, fingerprints, etc.) to an eye-facing surface of the single NED screen 106. By way of example and not limitation, an outer region of the flexible shroud 108 may be coupled to the eye-facing surface of the single NED screen 106 via a sealing structure 126 of the HMD support frame 110. Inner portions of the flexible shroud 108 may be coupled to exterior surfaces of the rigid housings 118, 122 of the eyecups 102, 104. The optical lenses 114, 116 may also be sealed (e.g., hermetically sealed) against and supported by the rigid housings 118, 122. The optical lenses 114, 116 may be positioned to focus images displayed by the single NED screen 106 to the user's eyes when the HMD assembly 100 is donned by the user.

The single NED screen 106 may include an electronic display screen for presenting visual content to the user. For example, the single NED screen 106 may include a liquid crystal display (LCD), light-emitting diode (LED) display, organic LED (OLED) display, a waveguide for directing light from a projector to the user, and/or any other suitable type of display screen. In some embodiments, the single NED screen 106 may be configured for displaying respective stereoscopic images to the user through the first eyecup 102 and the second eyecup 104 to create an impression of a three-dimensional image.

The first eyecup 102 and the second eyecup 104 may be movable (e.g., in a direction that is parallel to a surface of the single NED screen 106, such as in a left-and-right direction from the perspective of FIGS. 1A and 1B) relative to each other to adjust for an IPD of the user's eyes. At least one of the eyecups 102, 104 may also be movable relative to the single NED screen 106. For example, the eyecups 102, 104 may be movable along at least one track 128 mounted on the HMD support frame 110. By way of example and not limitation, as shown in FIG. 1B, the track 128 may include a toothed rack configured for engaging corresponding toothed pin elements, which may be rotatably coupled to the rigid housings 118, 122. In some embodiments, the first eyecup 102 and the second eyecup 104 may be movable relative to each other over a distance of up to about 10 mm. The eyecups 102, 104 may be independently movable relative to the HMD support frame 110, or the eyecups 102, 104 may be configured to simultaneously move inward (e.g., toward each other) or outward (e.g., away from each other) at substantially equal distances and rates relative to the single NED screen 106.

One or more IPD input mechanisms 130 (e.g., switches, sliders, knobs, buttons, etc.) may be integrated into the HMD support frame 110 and configured to allow the user of the HMD assembly 100 to adjust the IPD of the eyecups 102, 104 according to preference. Alternatively or additionally, IPD adjustments may be made by one or more electromechanical actuators (e.g., linear actuators, rotational motors, etc.), which may be controlled by a computing system associated with the HMD assembly 100 or by the user's manipulation of the IPD input mechanisms 130. The track 128, corresponding toothed pin elements, and IPD input mechanisms 130 may form an IPD adjustment mechanism. In some examples, a component of the IPD adjustment mechanism (e.g., a gear shaft, an IPD adjustment bracket, etc.) may pass through the flexible shroud 108. The flexible shroud 108 may be sealed against such a component to inhibit the passage of contaminants.

In some examples, the term "substantially" in reference to a given parameter, property, or condition may mean and include to a degree that one of ordinary skill in the art would understand that the given parameter, property, or condition is met with a small degree of variance, such as within acceptable manufacturing tolerances. By way of example, depending on the particular parameter, property, or condition that is substantially met, the parameter, property, or condition may be at least 90% met, at least 95% met, or even at least 99% met.

As the eyecups 102, 104 move in the manner described above, the flexible shroud 108 may deform (e.g., flex) to accommodate the movement of the eyecups 102, 104 while maintaining the seal over the single NED screen 106. The flexible shroud 108 may be formed of any material or combination of materials that is sufficiently flexible to allow the eyecups 102, 104 to move for IPD adjustments while substantially blocking the passage of contaminants. By way of example and not limitation, the flexible shroud 108 may include an elastomeric material, such as at least one of: a silicone material; a thermoplastic polyurethane material; a thermoplastic elastomer material; a thermoset elastomer material; a fluoroelastomer material; a natural rubber material; and/or a synthetic rubber material.

Figure 2A:
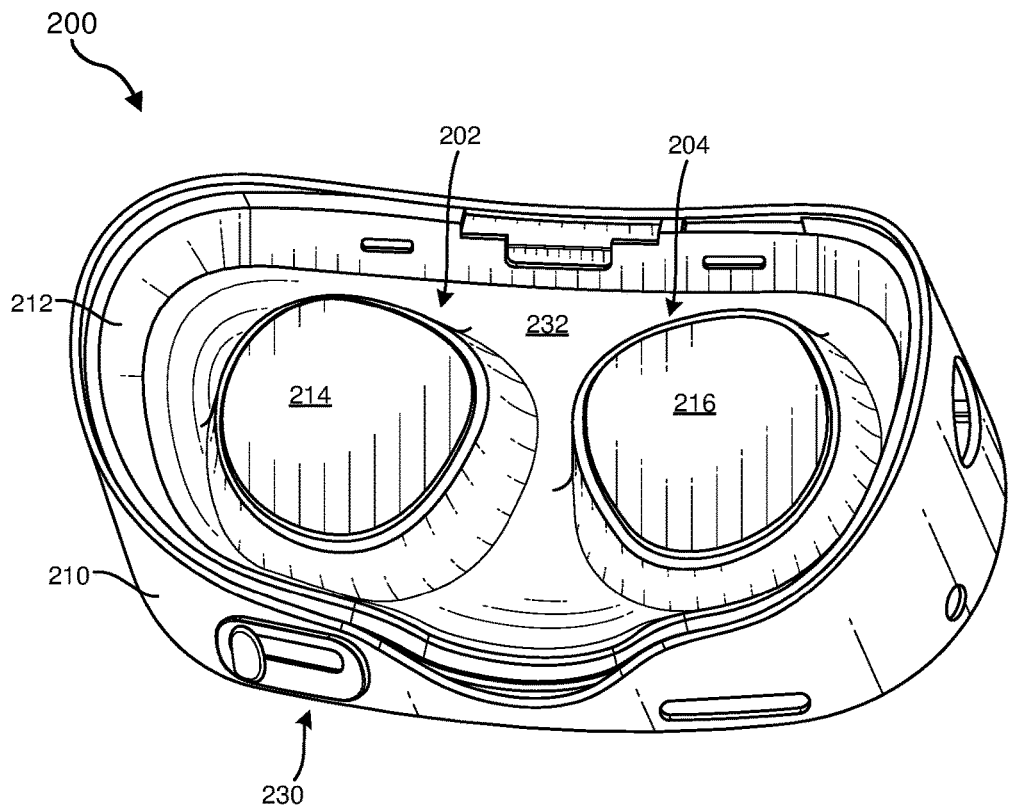
FIG. 2A is a perspective view and FIG. 2B is a cross-sectional side view of a head-mounted display assembly, according to at least one additional embodiment of the present disclosure.
Figure 2B:
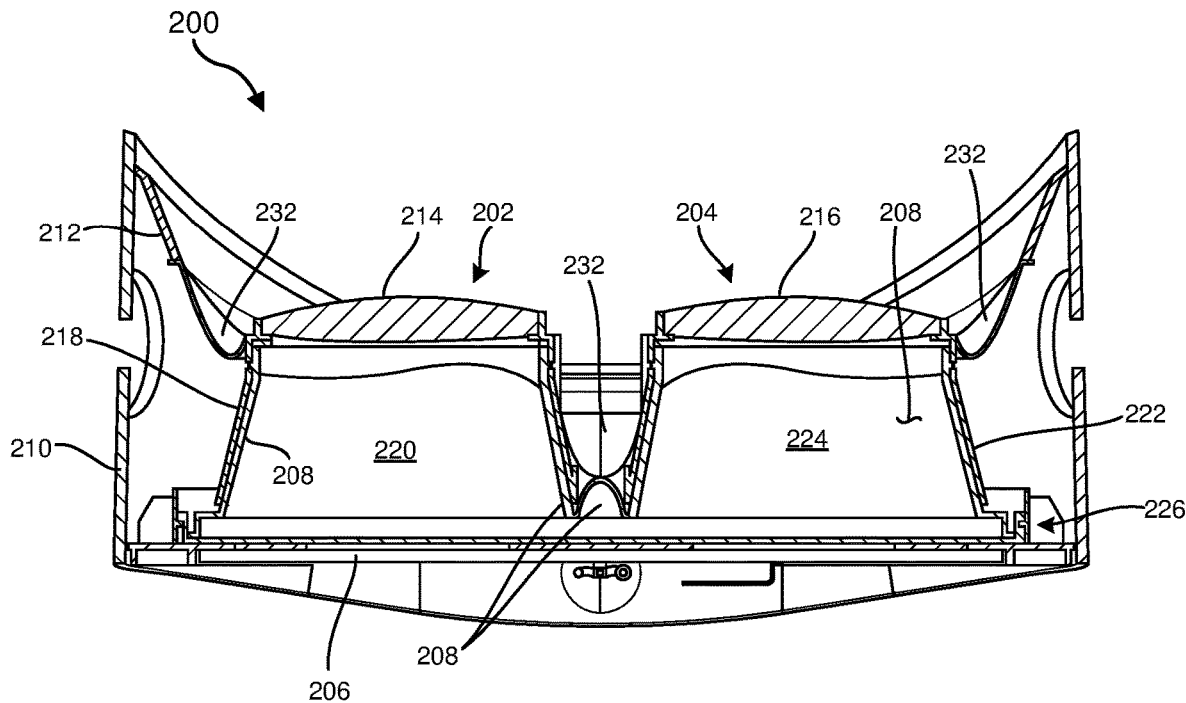

FIG. 2A is a perspective view and FIG. 2B is a cross-sectional side view of an HMD assembly 200, according to at least one additional embodiment of the present disclosure. Some aspects of the HMD assembly 200 of FIGS. 2A and 2B may be similar to the HMD assembly 100 of FIGS. 1A and 1B described above. For example, the HMD assembly 200 may include a first eyecup 202 and a second eyecup 204 positioned over a single NED screen 206. The eyecups 202, 204 and the single NED screen 206 may be coupled to and supported by an HMD support frame 210. An eye bracket 212 may be shaped and positioned for resting against the user's face when the HMD assembly 200 is donned by the user. The first eyecup 202 may include a first rigid housing 218 to which a first optical lens 214 may be coupled. The second eyecup 204 may include a second rigid housing 222 to which a second optical lens 216 may be coupled. The first rigid housing 218 may at least partially define a first interior volume 220 of the first eyecup 202. Similarly, the second rigid housing 222 may at least partially define a second interior volume 224 of the second eyecup 204. The eyecups 202, 204 may be movable relative to each other and/or relative to the single NED screen 206, such as to adjust for the user's IPD. The IPD input mechanism(s) 230 may be configured as a manual input for the user to adjust the IPD of the eyecups 202, 204.

The HMD assembly 200 of FIG. 2 may also include a flexible shroud 208 that may be configured to provide a seal (e.g., a hermetic seal) between the single NED screen 206, the first interior volume 220, and the second interior volume 224. In this example, the flexible shroud 208 may be positioned at least partially within the respective interior volumes 220, 224 of the eyecups 202, 204, rather than over exterior surfaces of the eyecups 202, 204. For example, inner regions of the flexible shroud 208 may be coupled to an interior of the rigid housings 218, 222, such as proximate to the respective optical lenses 214, 216. Outer regions of the flexible shroud 208 may be coupled to an upper surface of the single NED screen 206, such as via sealing structure 226 of the HMD support frame 210.

In some embodiments, a flexible cosmetic covering 232 may optionally be positioned over and obscuring the flexible shroud 208 and/or some exterior portions of the eyecups 202, 204. For example, the flexible cosmetic covering 232 may include a textile material and/or an elastomer material.

The HMD assembly 200 with the flexible shroud 208 positioned at least partially within the eyecups 202, 204 may enable the IPD adjustment mechanism and portions of the eyecups 202, 204 (e.g., the rigid housings 218, 222) to be located outside of the sealed portion of the flexible shroud 208. This configuration may further inhibit contaminants from reaching the single NED screen 206, since there may be fewer moving parts located within the sealed volume, compared to the HMD assembly 100 described above.

Figure 3:
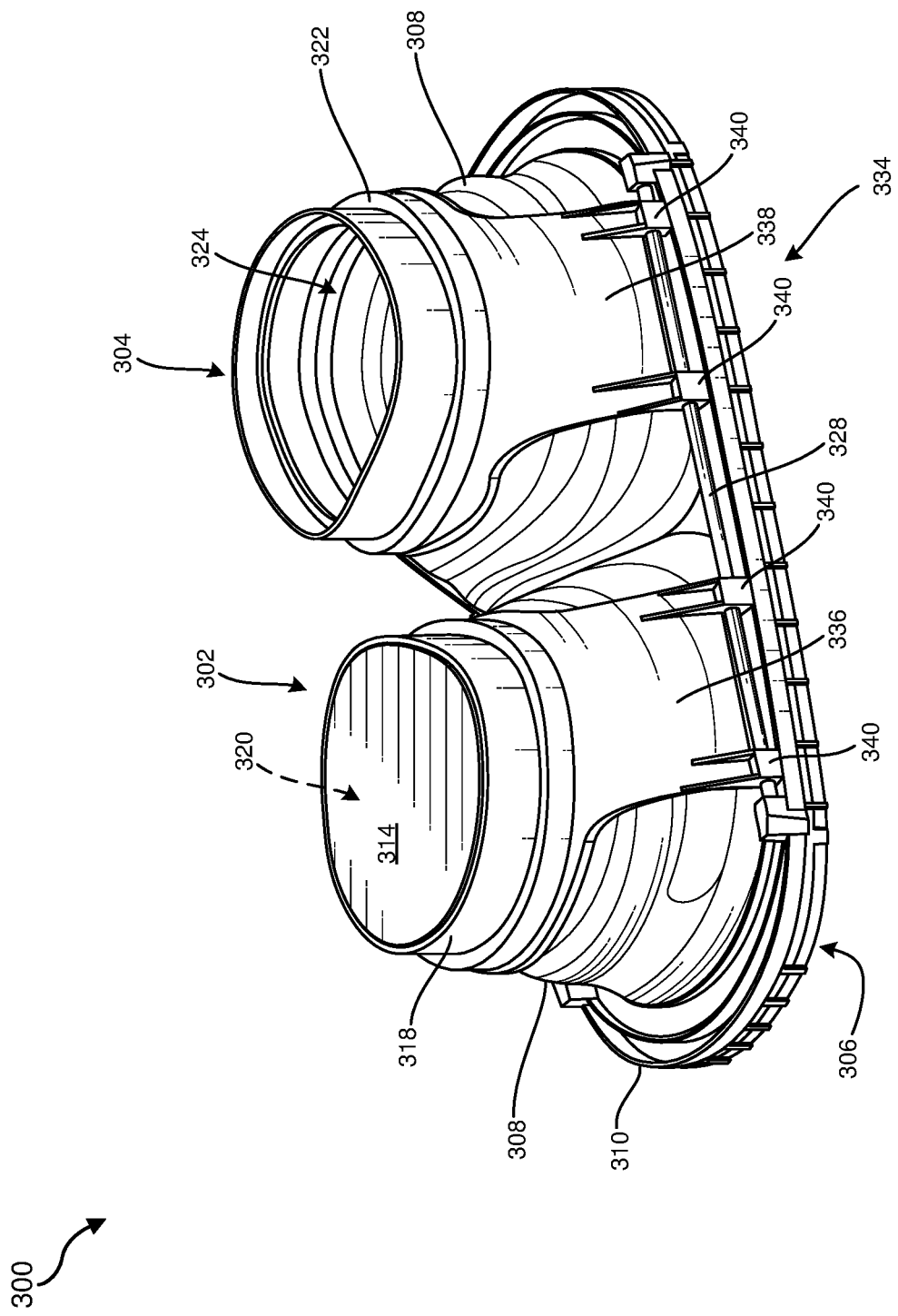
FIG. 3 is a perspective view of a portion of a head-mounted display assembly, according to at least one embodiment of the present disclosure.

FIG. 3 is a perspective view of a portion of an HMD assembly 300, according to additional embodiments of the present disclosure. Some components of the HMD assembly 300 are removed in FIG. 3 to better view underlying portions of the HMD assembly 300. The HMD assembly 300 of FIG. 3 may be similar to the HMD assembly 200 described above with reference to FIG. 2. For example, the HMD assembly 300 may include a first eyecup 302 and a second eyecup 304 positioned over a single NED screen 306. The eyecups 302, 304 and the single NED screen 306 may be coupled to and supported by an HMD support frame 310. The first eyecup 302 may include a first rigid housing 318 to which a first optical lens 314 may be coupled. The second eyecup 304 may include a second rigid housing 322 to which a second optical lens (not shown in the view of FIG. 3 for clarity) may be coupled. The first rigid housing 318 may at least partially define a first interior volume 320 of the first eyecup 302. Similarly, the second rigid housing 322 may at least partially define a second interior volume 324 of the second eyecup 304. The HMD assembly 300 may also include a flexible shroud 308 that may be configured to provide a seal (e.g., a hermetic seal) between the single NED screen 306, the first interior volume 320, and the second interior volume 324. Similar to the embodiment described above with reference to FIG. 2, the flexible shroud 308 of the HMD assembly 300 of FIG. 3 may be positioned at least partially within the respective interior volumes 320, 324 of the eyecups 302, 304.

The eyecups 302, 304 may be movable relative to each other and/or relative to the single NED screen 306, such as to adjust for the user's IPD. The HMD assembly 300 of FIG. 3 may also include an IPD adjustment mechanism 334, which may include a track 328 (e.g., a rod, a slide, etc.), a first IPD adjustment bracket 336 slidably coupling the first rigid housing 318 to the track 328, and a second IPD adjustment bracket 338 slidably coupling the second rigid housing 322 to the track 328. The IPD adjustment mechanism 334 may, in some examples, also include one or more IPD input mechanisms (not shown in the view of FIG. 3, but similar to the IPD input mechanisms 130, 230 described above) with which the user may interact to control the movement of the eyecups 302, 304 for IPD adjustments. In addition, a cam, pusher, electromechanical actuator (e.g., a motor, a linear actuator, etc.), or other suitable component may be included to move the IPD adjustment brackets 336, 338 and eyecups 302, 304 along the track 328.

As illustrated in FIG. 3, the IPD adjustment brackets 336, 338 may, in some embodiments, each include two spaced apart slider elements 340 engaged with and movable along the track 328, such as to provide sufficient stability to the respective eyecups 302, 304. The slider elements 340 may be engaged with the track 328 in a manner that maintains the eyecups 302, 304 in position after an IPD adjustment is made. In some examples, the HMD assembly 300 may optionally include another set of a track and IPD adjustment brackets positioned on an opposite side of the eyecups 302, 304 from the track 328 and IPD adjustment brackets 336, 338 shown in FIG. 3, such as for additional mechanical stability.

FIGS. 4A-4F are side views of portions of respective HMD assemblies 400A-400F, according to various embodiments of the present disclosure. The HMD assemblies 400A-400F are referred to collectively as "HMD assemblies 400." The various HMD assemblies 400 of FIGS. 4A-4F illustrate a variety of different options for physically arranging respective rigid and flexible portions of the HMD assemblies 400.

Figure 4A:
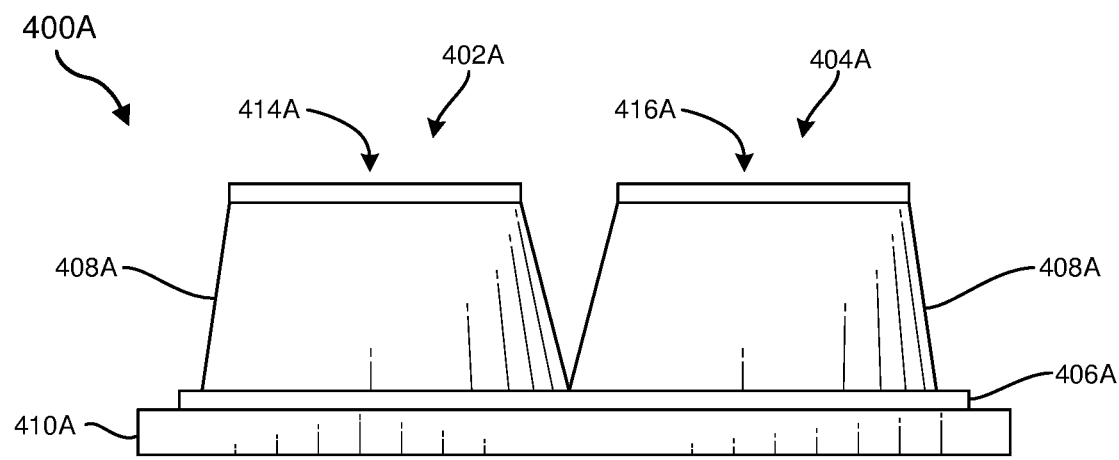
FIGS. 4A-4F are side views of portions of head-mounted display assemblies, according to various embodiments of the present disclosure.

Referring to FIG. 4A, the HMD assembly 400A may include a first eyecup 402A and a second eyecup 404A positioned over a single NED screen 406A. A flexible shroud 408A may be positioned to cover substantially the entire lateral outer surfaces of the eyecups 402A, 404A, between the single NED screen 406A and/or a portion of an HMD support frame 410A adjacent to the single NED screen 406A to respective first and second optical lenses 414A, 416A supported by the eyecups 402A, 404A. As illustrated in FIG. 4A, a portion of the flexible shroud 408A between the eyecups 402A, 404A may extend substantially fully down from the optical lenses 414A, 416A to the single NED screen 406A and/or the HMD support frame 410A adjacent to the single NED screen 406A.

Figure 4B:
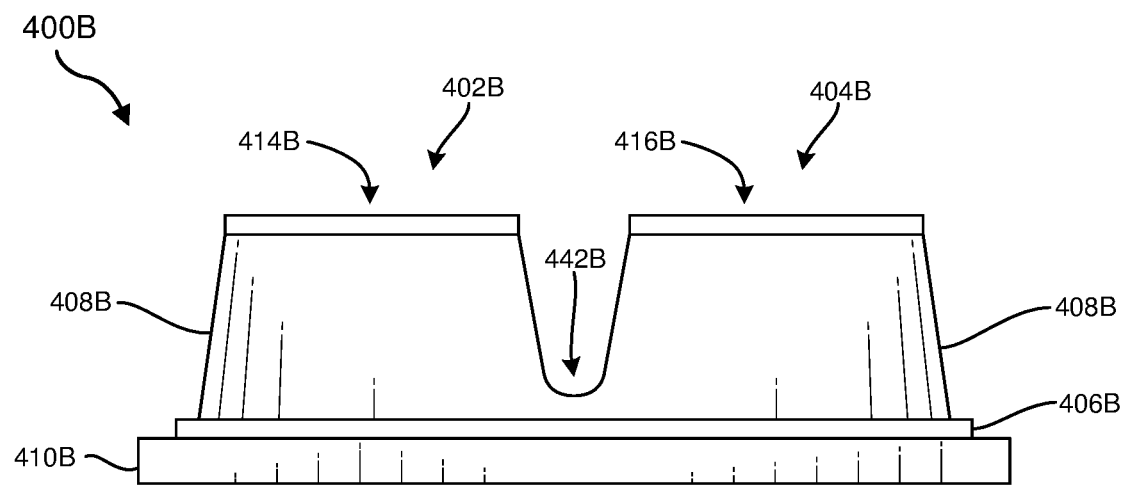

Referring to FIG. 4B, the HMD assembly 400B may be similar to the HMD assembly 400A of FIG. 4A. For example, the HMD assembly 400B may include a first eyecup 402B and a second eyecup 404B positioned over a single NED screen 406B. A flexible shroud 408B may be positioned to cover substantially the entire lateral outer surfaces of the eyecups 402B, 404B, between the single NED screen 406B and/or a portion of an HMD support frame 410B adjacent to the single NED screen 406B to respective first and second optical lenses 414B, 416B supported by the eyecups 402B, 404B. In the example illustrated in FIG. 4B, the flexible shroud 408B may include a connection region 442B between the eyecups 402B, 404B and adjacent to the single NED screen 406B to link the respective portions of the flexible shroud 408B. In some examples, the connection region 442B may have a curved configuration (e.g., from a side view, as in FIG. 4B). In some embodiments, the connection region 442B may alleviate mechanical stress, buckling, or folding of the flexible shroud 408B when the eyecups 402B, 404B are moved to make IPD adjustments.

Figure 4C:
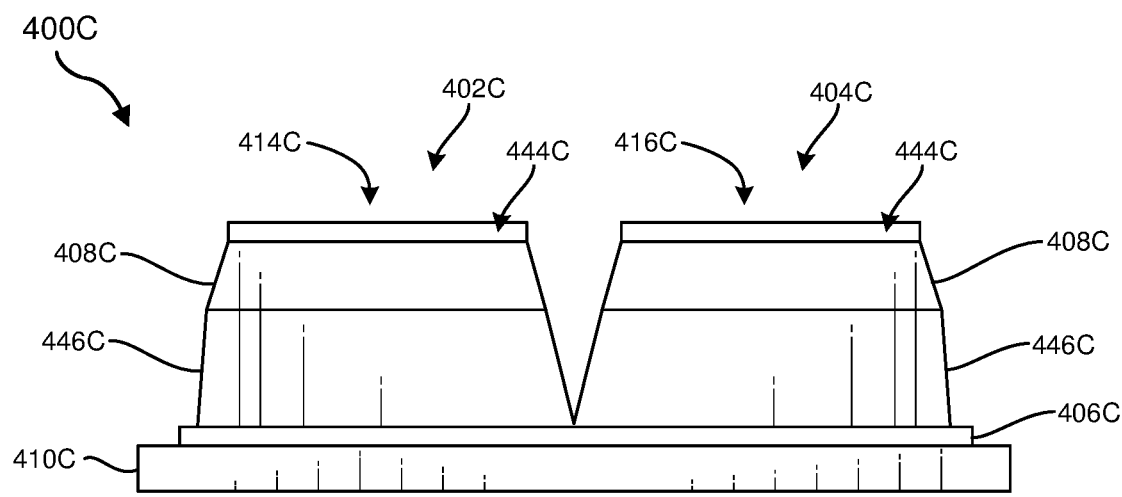

Referring to FIG. 4C, the HMD assembly 400C may be similar to the HMD assembly 400A of FIG. 4A. For example, the HMD assembly 400C may include a first eyecup 402C and a second eyecup 404C positioned over a single NED screen 406C. First and second optical lenses 414C, 416C may be supported by the eyecups 402C, 404C. In this example, each of the eyecups 402C, 404C may include an upper portion 444C that supports the optical lenses 414C, 416C and a lower portion 446C. The upper portions 444C may be movable relative to each other, a corresponding HMD support frame 410C, and/or relative to the single NED screen 406C. The lower portions 446C may be fixed relative to the corresponding HMD support frame 410C and/or relative to the single NED screen 406C. The lower portions 446C may be secured over the single NED screen 406C in a manner to form a seal (e.g., a hermetic seal) over the single NED screen 406C. A flexible shroud 408C may be positioned to cover at least a portion of lateral outer surfaces of the upper portions 444C of the eyecups 402C, 404C. In other words, the flexible shroud 408C may be positioned to extend from the fixed lower portions 446C of the eyecups 402C, 404C to the movable upper portions 444C of the eyecups 402C, 404C, which may allow the upper portions 444C and optical lenses 414C, 416C to move while maintaining a sealed interior.

Figure 4D:
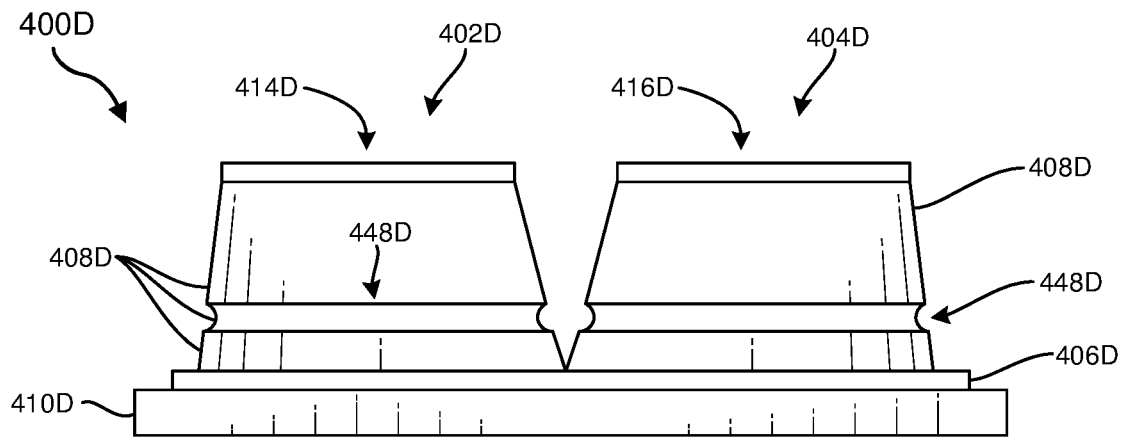

Referring to FIG. 4D, the HMD assembly 400D may be similar to the HMD assembly 400A of FIG. 4A. For example, the HMD assembly 400D may include a first eyecup 402D and a second eyecup 404D positioned over a single NED screen 406D. A flexible shroud 408D may be positioned to cover substantially the entire lateral outer surfaces of the eyecups 402D, 404D, between the single NED screen 406D and/or a portion of an HMD support frame 410D adjacent to the single NED screen 406D to respective first and second optical lenses 414D, 416D supported by the eyecups 402D, 404D. In this example, the flexible shroud 408D may include a recess 448D at least partially surrounding each of the eyecups 402D, 404D. For example, the recess 448D may be a groove or an inward fold. Due to its shape and configuration, the recess 448D may improve the flexibility of the flexible shroud 408D, such as by providing additional material at the recess 448D and/or a location for bending. In some embodiments, the recess 448D may inhibit (e.g., reduce or eliminate) buckling of the flexible shroud 408D.

Figure 4E:
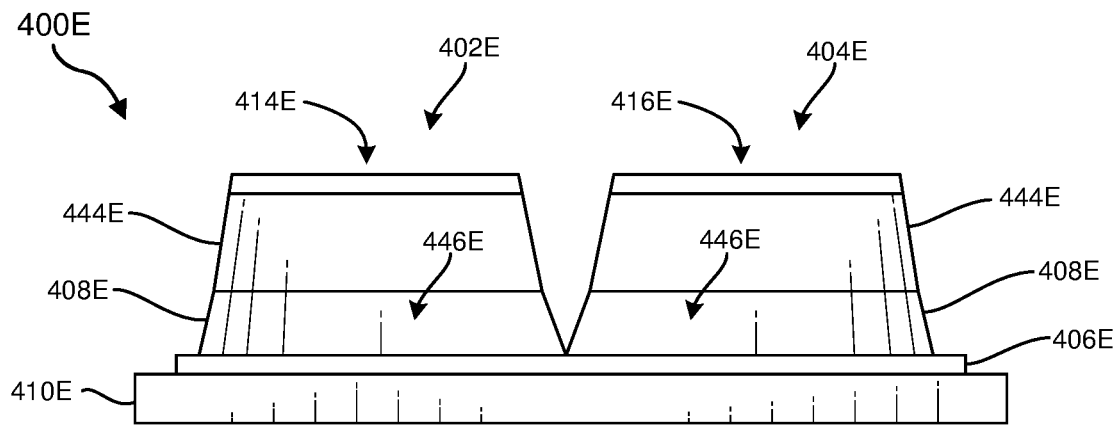

Referring to FIG. 4E, the HMD assembly 400E may be similar to the HMD assembly 400A of FIG. 4A. For example, the HMD assembly 400E may include a first eyecup 402E and a second eyecup 404E positioned over a single NED screen 406E. First and second optical lenses 414E, 416E may be supported by the eyecups 402E, 404E. In this example, the eyecups 402E, 404E may include an upper portion 444E proximate to and supporting the optical lenses 414E, 416E and a lower portion 446E proximate to the single NED screen 406E and a portion of an HMD support frame 410E adjacent to the single NED screen 406E. A flexible shroud 408E may be positioned to cover lateral outer surfaces of the lower portion 446E of the eyecups 402E, 404E while leaving lateral outer surfaces of the upper portion 444E exposed. In other words, the flexible shroud 408E may be positioned to extend from an intermediate location (e.g., a location between the single NED screen 406E and the optical lenses 414E, 416E) along the eyecups 402E, 404E to the single NED screen 406E and/or to a portion of the HMD support frame 410E adjacent to the single NED screen 406E. The positioning of the flexible shroud 408E over the lower portion 446E of the eyecups 402E, 404E while leaving the upper portion 444E exposed may facilitate coupling an IPD adjustment mechanism to the upper portion 444E. Additionally, the flexible shroud 408E may be less visible to the user than in some other examples.

Figure 4F:
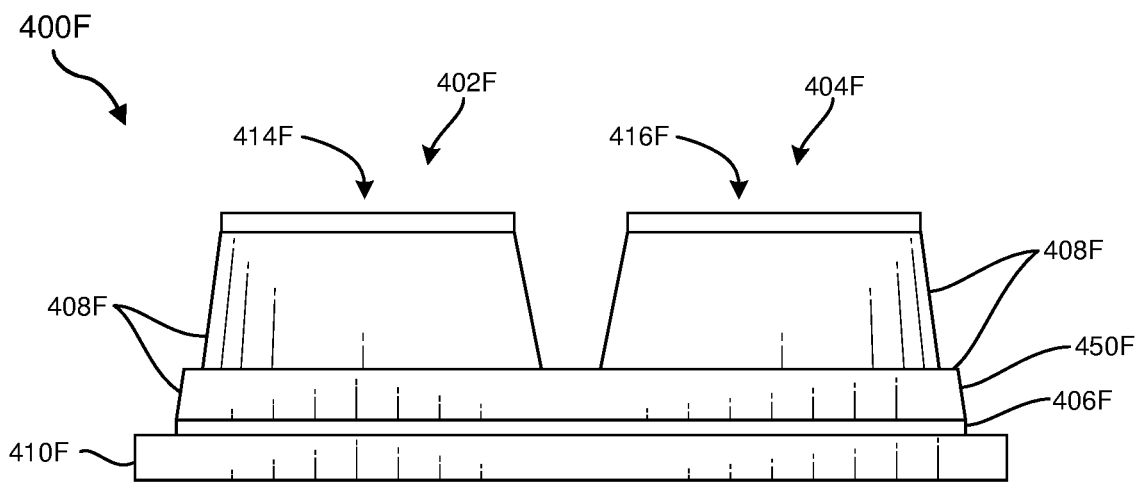

Referring to FIG. 4F, the HMD assembly 400F may be similar to the HMD assembly 400A of FIG. 4A. For example, the HMD assembly 400F may include a first eyecup 402F and a second eyecup 404F positioned over a single NED screen 406F. A flexible shroud 408F may be positioned to cover substantially the entire lateral outer surfaces of the eyecups 402F, 404F, between the single NED screen 406F and/or a portion of an HMD support frame 410F adjacent to the single NED screen 406F to respective first and second optical lenses 414F, 416F supported by the eyecups 402F, 404F. In this example, the flexible shroud 408F may include an enlarged base portion 450F adjacent to the single NED screen 406F, as shown in FIG. 4F. The presence of the base portion 450F may facilitate sealing the flexible shroud 408F to the single NED screen 406F and/or a portion of an HMD support frame 410F adjacent to the single NED screen 406F.

Figure 5:
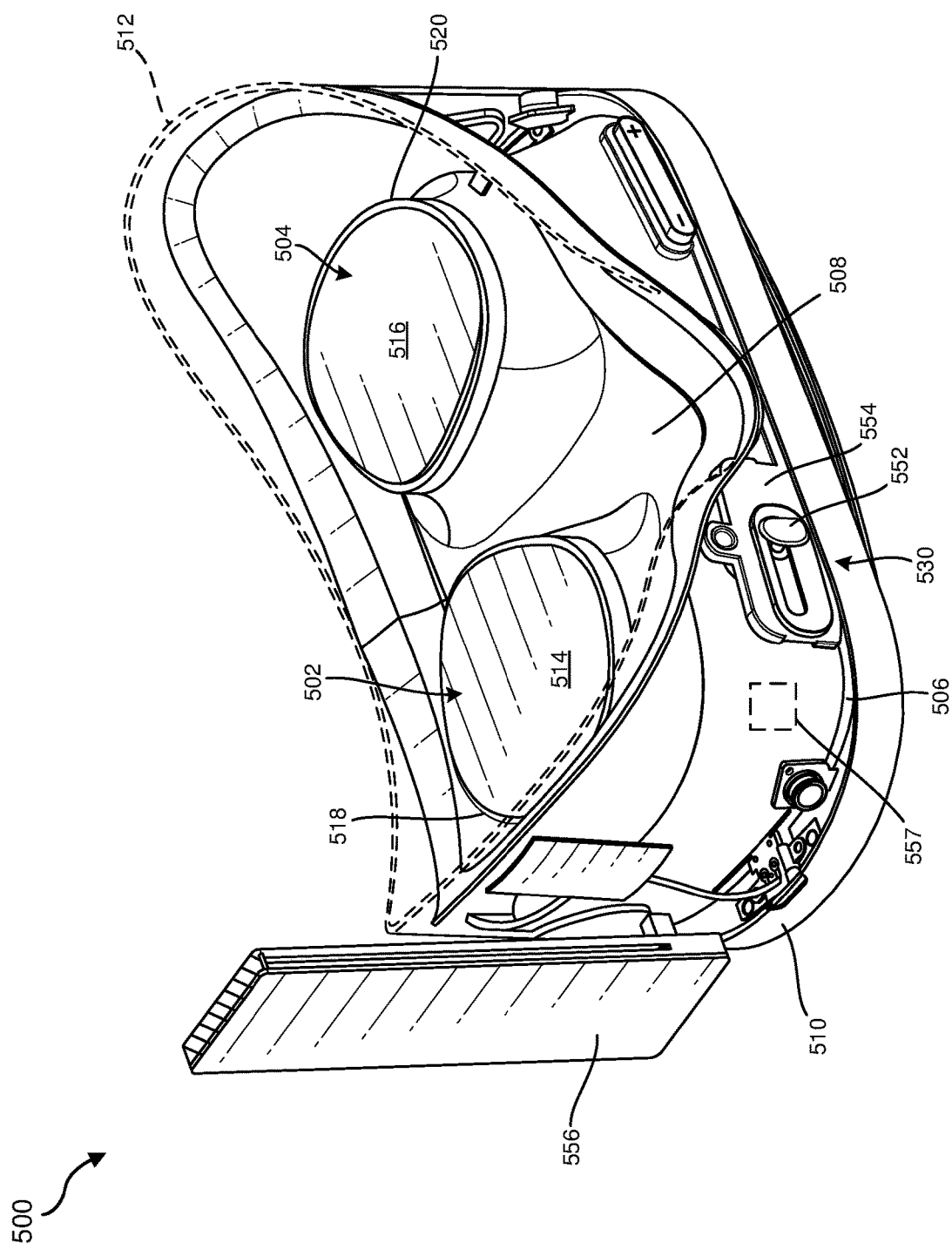
FIG. 5 is a perspective view of a head-mounted display assembly, according to at least one embodiment of the present disclosure.

FIG. 5 is a perspective view of an HMD assembly 500, according to at least one additional embodiment of the present disclosure. The HMD assembly 500 may include a first eyecup 502 and a second eyecup 504 positioned over a single NED screen 506. As in the examples described above, a flexible shroud 508 may at least partially cover lateral outer surfaces of the eyecups 502, 504. The single NED screen 506, as well as other components of the HMD assembly 500, may be supported by an HMD support frame 510. Portions of the frame 510 are illustrated in FIG. 5 as transparent for a clearer view of underlying components. An eye bracket 512, which may be configured, positioned, and shaped for resting against a user's face, may be coupled to the frame 510. A first optical lens 514 may be coupled to and supported by a first rigid housing 518 of the first eyecup 502, and a second optical lens 516 may be coupled to and supported by a second rigid housing 520 of the second eyecup 504. An IPD input mechanism 530 may include a slider 552, which may be manipulated by the user to adjust a position of the eyecups 502, 504, such as to substantially match the user's IPD. Since the flexible shroud 508 is positioned on an exterior side of the eyecups 502, 504, at least a portion of the IPD input mechanism 530 may pass through or around the flexible shroud 508. A sliding seal mechanism 554 may be used to maintain a seal where the IPD input mechanism 530 passes through or around the flexible shroud 508. A head strap 556 may be coupled to the HMD support frame 510 for supporting the HMD assembly 500 on a user's head.

In some embodiments, a location of images (e.g., stereoscopic images) displayed on the single NED screen 506 may be adjusted to coincide with the adjustment of the location of the eyecups 502, 504. Thus, when the IPD adjustment mechanism 530 is used, both the eyecups 502, 504 and corresponding images positioned for viewing through the eyecups 502, 504 may be moved. To facilitate the movement of the images displayed on the single NED screen 506, an eyecup location sensor 557 may be positioned and configured to sense the location of the eyecups 502, 504. Data from the eyecup location sensor 557 may be used by the HMD assembly 500 to move the corresponding images to appropriate locations on the single NED screen 506. The eyecup location sensor 557 may include, for example, a rotary encoder, a potentiometer, a hall effect sensor, a capacitive sensor, etc.

Figure 6:
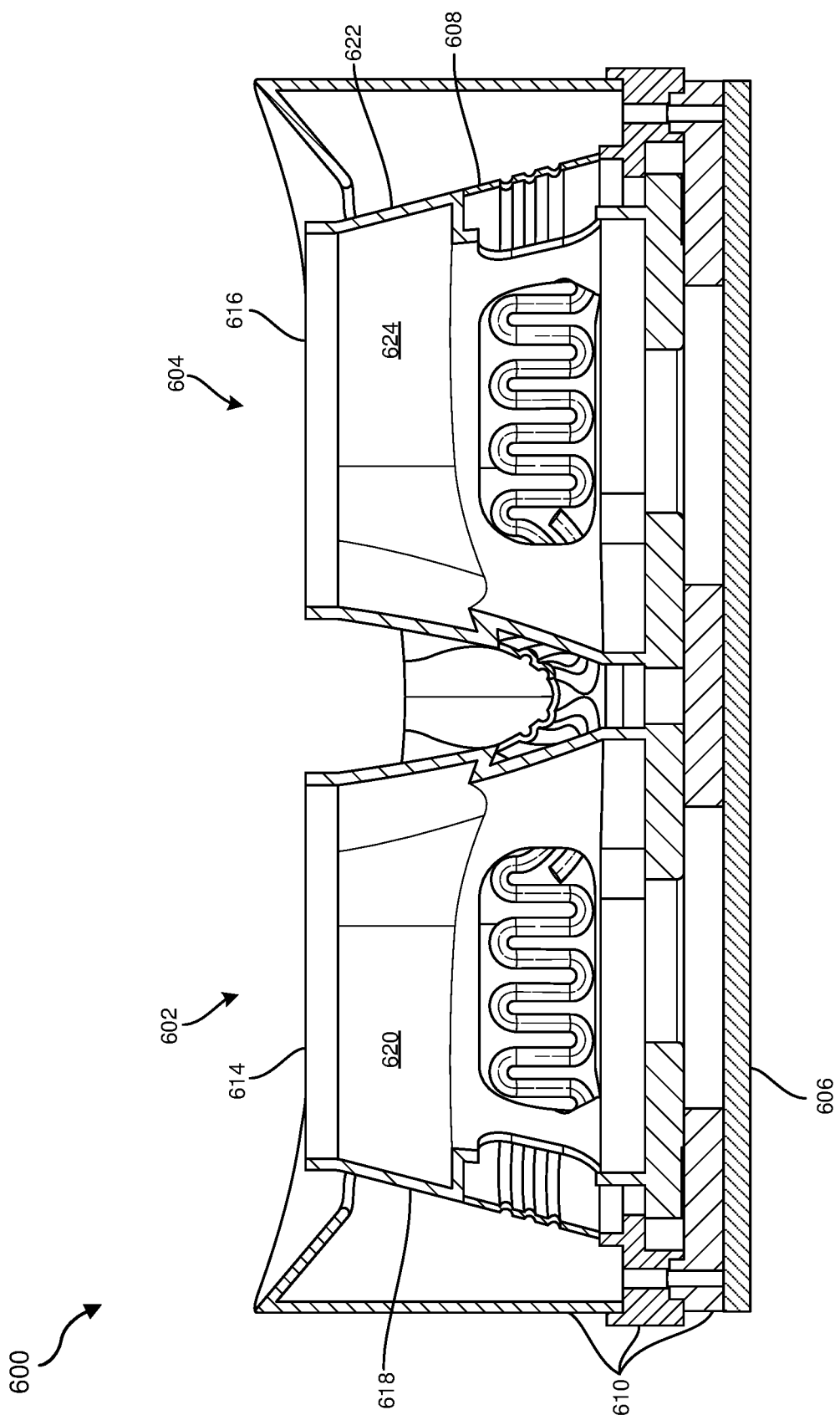
FIG. 6 is a cross-sectional side view of a head-mounted display assembly, according to at least one additional embodiment of the present disclosure.

FIG. 6 is a cross-sectional side view of an HMD assembly 600, according to at least one additional embodiment. Like the HMD assembly 100 described above with reference to FIGS. 1A and 1B, the HMD assembly 600 may include a first eyecup 602 and a second eyecup 604 positioned over a single NED screen 606. The eyecups 602, 604 may be movable toward and away from each other to adjust for a user's IPD. A flexible shroud 608 may be positioned to provide a seal between a first interior volume 620 of the first eyecup 602, a second interior volume 624 of the second eyecup 604, and the single NED screen 606. A first optical lens 614 may be coupled to and supported by a first rigid housing 618 of the first eyecup 602. Similarly, a second optical lens 616 may be coupled to and supported by a second rigid housing 622 of the second eyecup 604. An HMD support frame 610 may support the other components of the HMD assembly 600.

As shown in FIG. 6, the flexible shroud 608 may be positioned to extend from a portion of the HMD support frame 610 proximate to the single NED screen 606 to an intermediate portion of the rigid housings 618, 622 of the respective eyecups 602, 604. In this example, a lower (e.g., closer to the single NED screen 606) portion of the rigid housings 618, 622 may be recessed radially inward, compared to an upper (e.g., further from the single NED screen 606) portion thereof. This recessed configuration may enable the flexible shroud 608 to flex inward and/or outward upon movement of the eyecups 602, 604.

The flexible shroud 608 may include an extensible shape, such that a portion of the flexible shroud 608 is configured to expand and/or contract under shear stress, which may be present when the eyecups 602, 604 are moved to make IPD adjustments. For example, the flexible shroud 608 may include a pleated shape, as shown in FIG. 6. The extensible shape may also inhibit bending of the flexible shroud 608 in unpredictable and/or undesirable ways.

FIG. 7 is a perspective view of several textured material samples 700A-700H (also referred to collectively as "textured material samples 700"), each of which has an extensible shape, according to various embodiments of the present disclosure. The textured material samples 700 illustrate example material configurations that may be used in flexible shrouds of HMD assemblies, such as any of the HMD assemblies described herein.

The first textured material sample 700A includes an array of rounded bumps (which may be recesses when viewed from an opposite side thereof) separated from each other by valleys. The second textured material sample 700B includes a pleated shape, which includes a set of elongated parallel recesses (which may be elongated bumps when viewed from an opposite side thereof). The third textured material sample 700C includes an array of rounded bumps separated from each other by valleys. The third textured material sample 700C may be similar to the first textured material sample 700A, but each of the rounded bumps may be larger than the rounded bumps of the first textured material sample 700A. The fourth textured material sample 700D includes a crosshatched pattern of elongated recesses. The fifth textured material sample 700E includes an array of peaked bumps separated by valleys. The sixth textured material sample 700F includes a pleated shape, which includes a set of elongated parallel recesses (which may be elongated bumps when viewed from an opposite side thereof). The sixth textured material sample 700F may be similar to the second textured material sample 700B, but each of the recesses may be narrower. The seventh textured material shape 700G includes an array of peaked bumps separated by valleys. The seventh textured material sample 700G may be similar to the fifth textured material sample 700E, but the peaked bumps may be larger than the peaked bumps of the fifth textured material sample 700E. The eighth textured material sample 700H includes a set of elongated parallel recesses (which may be elongated bumps when viewed from an opposite side thereof) that are oriented at an angle to peripheral edges of the eighth textured material sample 700H.

FIG. 8 is a perspective view of a flexible shroud 800 for use in an HMD assembly (such as one of the HMD assemblies described herein), according to at least one embodiment of the present disclosure. As shown in FIG. 8, the flexible shroud 800 may include an inner region 856 that is shaped and configured for coupling to (e.g., to form a seal against) respective eyecups and an outer region 858 that is shaped and configured for coupling (e.g., to form a seal against) a single NED screen and/or an HMD support frame adjacent to the single NED screen. An intermediate region 860 between the inner region 856 and the outer region 858 may, in some examples, include an extensible shape, such as the textured material samples 700 described above. As shown in FIG. 8, in some embodiments the outer region 858 may optionally include through holes 862, such as to facilitate coupling the flexible shroud 800 to the single NED screen and/or to the HMD support frame. In some examples, the flexible shroud 800 may be formed of an integral, unitary material (e.g., rather than multiple pieces that are attached to each other).

FIG. 9 is a flow diagram illustrating a method 900 of fabricating an HMD assembly, according to at least one embodiment of the present disclosure. At operation 910, a first eyecup and a second eyecup may be positioned over a single NED screen. The eyecups may be positioned to move relative to each other, such as to adjust for an IPD of a user of the HMD assembly. Operation 910 may be performed in a variety of ways. For example, the eyecups may be positioned as discussed above and as shown in any of FIGS. 1A-6.

At operation 920, an outer region of a flexible shroud may be coupled to the single NED screen, such as to form a hermetic seal around at least a portion of the single NED screen. Operation 920 may be performed in a variety of ways. For example, the flexible shroud may be directly coupled to the single NED screen or indirectly coupled to the single NED screen, such as through a sealing structure of a corresponding HMD support frame. The flexible shroud may be coupled to the single NED screen by any suitable fastener, such as rivets, screws, an adhesive material, clamps, or any combination thereof.

At operation 930, an inner region of the flexible shroud may be coupled to the first eyecup and to the second eyecup. A seal (e.g., a hermetic seal) may be formed between a first interior volume of the first eyecup, a second interior volume of the second eyecup, and the single NED screen. Operation 930 may be performed in a variety of ways. For example, the inner region of the flexible shroud may be coupled to the eyecups as discussed above and as shown in any of FIGS. 1A-6.

In some examples, the method 900 may also include additional operations. For example, an IPD adjustment mechanism may be assembled to the first eyecup and to the second eyecup in a position to move the first eyecup and the second eyecup relative to each other, such as to adjust for an IPD. The flexible shroud may also be coupled to a component of the IPD adjustment mechanism to form a seal over at least a portion of the IPD adjustment mechanism.

FIG. 10 is a flow diagram illustrating a method 1000 of adjusting an interpupillary distance of an HMD assembly, according to at least one embodiment of the present disclosure. At operation 1010, a first eyecup and a second eyecup may be moved relative to each other and relative to a single NED screen over which the eyecups are mounted. At operation 1020, a seal between a first interior volume of the first eyecup, a second interior volume of the second eyecup, and the single NED screen may be maintained with a flexible shroud. Operations 1010 and 1020 may be performed in a variety of ways. For example, the eyecups may be moved while maintaining the seal as discussed above with reference to any of FIGS. 1A-8.

Accordingly, the present disclosure includes HMD assemblies and related methods that may enable IPD adjustments that inhibit (e.g., reduce or eliminate) the introduction of contamination onto a display screen or a surface of a corresponding optical lenses. At the same time, the disclosed HMD assemblies may include a single NED screen, which may reduce a cost of fabricating and operating the HMD assemblies. Various configurations and materials are disclosed, each of which may be advantageously employed for a variety of uses and applications.

As noted above, embodiments of the present disclosure may include or be implemented in conjunction with various types of artificial-reality systems. Artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial-reality systems may be implemented in a variety of different form factors and configurations. Artificial-reality systems may include an NED that provides visibility into the real world (e.g., an augmented-reality system) or that visually immerses a user in an artificial reality (e.g., virtual-reality system 1100 in FIG. 11). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

As noted, some artificial-reality systems may substantially replace one or more of a user's sensory perceptions of the real world with a virtual experience. One example of this type of system is a head-worn display system, such as the virtual-reality system 1100 in FIG. 11, that mostly or completely covers a user's field of view. The virtual-reality system 1100 may include a front rigid body 1102 and a band 1104 shaped to fit around a user's head. The virtual-reality system 1100 may also include output audio transducers 1106(A) and 1106(B). Furthermore, while not shown in FIG. 11, the front rigid body 1102 may include one or more electronic elements, including one or more electronic displays, one or more inertial measurement units (IMUS), one or more tracking emitters or detectors, and/or any other suitable device or system for creating an artificial reality experience.

Artificial-reality systems may include a variety of types of visual feedback mechanisms. For example, display devices in the virtual-reality system 1100 may include one or more liquid crystal displays (LCDs), light-emitting diode (LED) displays, organic LED (OLED) displays, and/or any other suitable type of display screen. As discussed above artificial-reality systems may include a single display screen for both eyes. Some artificial-reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial-reality systems may include one or more projection systems. For example, display devices in the virtual-reality system 1100 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. Artificial-reality systems may also be configured with any other suitable type or form of image projection system.

Artificial-reality systems may also include various types of computer vision components and subsystems. For example, the virtual-reality system 1100 may include one or more optical sensors, such as two-dimensional (2D) or 3D cameras, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

Artificial-reality systems may also include one or more input and/or output audio transducers. In the example shown in FIG. 11, the output audio transducers 1106(A) and 1106(B) may include voice coil speakers, ribbon speakers, electrostatic speakers, piezoelectric speakers, bone conduction transducers, cartilage conduction transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

While not shown in FIG. 11, artificial-reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial-reality experience in one or more of these contexts and environments and/or in other contexts and environments.

As noted, the artificial-reality system 1100 may be used with a variety of other types of devices to provide a more compelling artificial-reality experience. These devices may include haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Haptic feedback may be provided by interfaces positioned within a user's environment (e.g., chairs, tables, floors, etc.) and/or interfaces on articles that may be worn or carried by a user (e.g., gloves, wristbands, etc.). As an example, a vibrotactile system may be in the form of a wearable glove and/or wristband. The haptic device may include a flexible, wearable textile material that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

Haptic wearables may be implemented in a variety of types of artificial-reality systems and environments. FIG. 12 shows an example artificial-reality environment 1200 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Head-mounted display 1202 generally represents any type or form of virtual-reality system, such as the virtual-reality system 1100 in FIG. 11. Haptic device 1204 generally represents any type or form of wearable device, worn by a use of an artificial-reality system, that provides haptic feedback to the user to give the user the perception that he or she is physically engaging with a virtual object. In some embodiments, the haptic device 1204 may provide haptic feedback by applying vibration, motion, and/or force to the user. For example, the haptic device 1204 may limit or augment a user's movement. To give a specific example, the haptic device 1204 may limit a user's hand from moving forward so that the user has the perception that his or her hand has come in physical contact with a virtual wall. In this specific example, one or more actuators within the haptic advice may achieve the physical-movement restriction by pumping fluid into an inflatable bladder of the haptic device. In some examples, a user may also use the haptic device 1204 to send action requests to a console. Examples of action requests include, without limitation, requests to start an application and/or end the application and/or requests to perform a particular action within the application.

The haptic devices 1204 may include any suitable number and/or type of haptic transducer, sensor, and/or feedback mechanism. For example, the haptic devices 1204 may include one or more mechanical transducers, piezoelectric transducers, and/or fluidic transducers. The haptic devices 1204 may also include various combinations of different types and forms of transducers that work together or independently to enhance a user's artificial-reality experience.

By way of non-limiting examples, the following embodiments are included in the present disclosure.

Example 1: A head-mounted display assembly, which may include: a first eyecup and a second eyecup configured for positioning in front of intended locations of a user's eyes when the head-mounted display assembly is donned by the user, wherein the first eyecup and the second eyecup are movable relative to each other to adjust for an interpupillary distance of the user's eyes; a single near-eye display screen configured for displaying an image to the user through the first eyecup and the second eyecup; and a flexible shroud positioned to provide a seal between a first interior volume of the first eyecup, a second interior volume of the second eyecup, and the single near-eye display screen.

Example 2: The head-mounted display assembly of Example 1, wherein at least one of the first eyecup or the second eyecup is movable relative to the single near-eye display screen.

Example 3: The head-mounted display assembly of Example 1 or Example 2, wherein the flexible shroud includes an elastomeric material.

Example 4: The head-mounted display assembly of Example 3, wherein the flexible shroud includes at least one of: a silicone material; a thermoplastic polyurethane material; a thermoplastic elastomer material; a thermoset elastomer material; a fluoroelastomer material; a natural rubber material; or a synthetic rubber material.

Example 5: The head-mounted display assembly of any of Examples 1 through 4, wherein at least a portion of the flexible shroud includes an extensible shape such that the portion of the flexible shroud is configured to at least one of expand or contract under shear stress.

Example 6: The head-mounted display assembly of Example 5, wherein the extensible shape includes a pleated shape.

Example 7: The head-mounted display assembly of Example 5, wherein the extensible shape includes bumps separated from each other by valleys.

Example 8: The head-mounted display assembly of any of Examples 1 through 7, wherein the flexible shroud is positioned to provide a hermetic seal between the first interior volume of the first eyecup, the second interior volume of the second eyecup, and the single near-eye display screen.

Example 9: The head-mounted display assembly of any of Examples 1 through 8, further including a first optical lens mounted to the first eyecup and a second optical lens mounted to the second eyecup.

Example 10: The head-mounted display assembly of any of Examples 1 through 9, wherein: the first eyecup includes a first rigid housing at least partially defining the first interior volume; and the second eyecup includes a second rigid housing at least partially defining the second interior volume.

Example 11: The head-mounted display assembly of any of Examples 1 through 10, wherein the flexible shroud is mounted at least partially within the first interior volume of the first eyecup, at least partially within the second interior volume of the second eyecup, at least partially between the first rigid housing and the single near-eye display screen, and at least partially between the second rigid housing and the single near-eye display screen.

Example 12: The head-mounted display assembly of Example 11, further including a flexible cosmetic covering positioned over and obscuring the flexible shroud.

Example 13: The head-mounted display assembly of Example 10, wherein the flexible shroud is mounted to a first exterior surface of the first rigid housing and to a second exterior surface of the second rigid housing.

Example 14: The head-mounted display assembly of any of Examples 1 through 13, wherein the single near-eye display screen is configured for displaying respective stereoscopic images to the user through the first eyecup and the second eyecup to create an impression of a three-dimensional image.

Example 15: The head-mounted display assembly of any of Examples 1 through 14, further including an eye bracket positioned at least partially over the flexible shroud, wherein the eye bracket is shaped and positioned for resting against the user's face when the head-mounted display assembly is donned by the user.

Example 16: The head-mounted display assembly of any of Examples 1 through 15, further including an interpupillary distance adjustment mechanism coupled to the first eyecup and to the second eyecup for adjusting the distance between the first eyecup and the second eyecup.

Example 17: The head-mounted display assembly of any of Examples 1 through 16, wherein the first eyecup and the second eyecup are movable relative to each other over a distance of up to about 10 mm.

Example 18: A method of fabricating a head-mounted display assembly, which may include: positioning a first eyecup and a second eyecup over a single near-eye display screen that is configured for displaying an image to a user through the first eyecup and the second eyecup, wherein the first eyecup and the second eyecup are positioned to move relative to each other to adjust for an interpupillary distance of a user's eyes when the head-mounted display assembly is donned by the user; coupling an outer region of a flexible shroud to the single near-eye display screen; and coupling an inner region of the flexible shroud to the first eyecup and to the second eyecup, wherein the flexible shroud forms a seal between a first interior volume of the first eyecup, a second interior volume of the second eyecup, and the single near-eye display screen.

Example 19: The method of Example 18, further including: assembling and interpupillary distance adjustment mechanism to the first eyecup and to the second eyecup in a position to move the first eyecup and the second eyecup relative to each other; and coupling the flexible shroud to a component of the interpupillary distance adjustment mechanism to form a seal over at least a portion of the interpupillary distance adjustment mechanism.

Example 20: A method of adjusting an interpupillary distance of a head-mounted display assembly, which may include: moving a first eyecup and a second eyecup relative to each other and relative to a single near-eye display screen over which the first eyecup and the second eyecup are mounted; and maintaining a seal between a first interior volume of the first eyecup, a second interior volume of the second eyecup, and the single near-eye display screen with a flexible shroud.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A head-mounted display assembly, comprising:
    a first eyecup and a second eyecup configured for positioning in front of intended locations of a user's eyes when the head-mounted display assembly is donned by the user, wherein the first eyecup and the second eyecup are movable relative to each other to adjust for an interpupillary distance of the user's eyes;
    a single near-eye display screen configured for displaying an image to the user through the first eyecup and the second eyecup; and
    a flexible shroud positioned to provide a hermetic seal between a common volume defined by a first interior volume of the first eyecup, a second interior volume of the second eyecup, and the single near-eye display screen, wherein the flexible shroud is positioned at least partially within the first interior volume of the first eyecup and the second interior volume of the second eyecup.

2. The head-mounted display assembly of claim 1, wherein at least one of the first eyecup or the second eyecup is movable relative to the single near-eye display screen.

3. The head-mounted display assembly of claim 1, wherein the flexible shroud comprises an elastomeric material.

4. The head-mounted display assembly of claim 3, wherein the flexible shroud comprises at least one of:
    a silicone material;
    a thermoplastic polyurethane material;
    a thermoplastic elastomer material;
    a thermoset elastomer material;
    a fluoroelastomer material;
    a natural rubber material; or
    a synthetic rubber material.

5. The head-mounted display assembly of claim 1, wherein at least a portion of the flexible shroud comprises an extensible shape such that the portion of the flexible shroud is configured to at least one of expand or contract under shear stress.

6. The head-mounted display assembly of claim 5, wherein the extensible shape comprises a pleated shape.

7. The head-mounted display assembly of claim 5, wherein the extensible shape comprises bumps separated from each other by valleys.

8. The head-mounted display assembly of claim 1, further comprising a first optical lens mounted to the first eyecup and a second optical lens mounted to the second eyecup.

9. The head-mounted display assembly of claim 1, wherein:
    the first eyecup comprises a first rigid housing at least partially defining the first interior volume; and
    the second eyecup comprises a second rigid housing at least partially defining the second interior volume.

10. The head-mounted display assembly of claim 9, wherein the flexible shroud is mounted at least partially within the first interior volume of the first eyecup, at least partially within the second interior volume of the second eyecup, at least partially between the first rigid housing and the single near-eye display screen, and at least partially between the second rigid housing and the single near-eye display screen.

11. The head-mounted display assembly of claim 10, further comprising a flexible cosmetic covering positioned over and obscuring the flexible shroud.

12. The head-mounted display assembly of claim 9, wherein the flexible shroud is mounted to a first exterior surface of the first rigid housing and to a second exterior surface of the second rigid housing.

13. The head-mounted display assembly of claim 1, wherein the single near-eye display screen is configured for displaying respective stereoscopic images to the user through the first eyecup and the second eyecup to create an impression of a three-dimensional image.

14. The head-mounted display assembly of claim 1, further comprising an eye bracket positioned at least partially over the flexible shroud, wherein the eye bracket is shaped and positioned for resting against the user's face when the head-mounted display assembly is donned by the user.

15. The head-mounted display assembly of claim 1, further comprising an interpupillary distance adjustment mechanism coupled to the first eyecup and to the second eyecup for adjusting a distance between the first eyecup and the second eyecup.

16. The head-mounted display assembly of claim 1, wherein the first eyecup and the second eyecup are movable relative to each other over a distance of up to about 10 mm.

17. A method of fabricating a head-mounted display assembly, comprising:
    positioning a first eyecup and a second eyecup over a single near-eye display screen that is configured for displaying an image to a user through the first eyecup and the second eyecup, wherein the first eyecup and the second eyecup are positioned to move relative to each other to adjust for an interpupillary distance of a user's eyes when the head-mounted display assembly is donned by the user;
    coupling an outer region of a flexible shroud to the single near-eye display screen; and
    coupling an inner region of the flexible shroud to the first eyecup and to the second eyecup, wherein the flexible shroud forms a hermetic seal between a common volume defined by a first interior volume of the first eyecup, a second interior volume of the second eyecup, and the single near-eye display screen, wherein the flexible shroud is positioned at least partially within the first interior volume of the first eyecup and the second interior volume of the second eyecup.

18. The method of claim 17, further comprising:
    assembling an interpupillary distance adjustment mechanism to the first eyecup and to the second eyecup in a position to move the first eyecup and the second eyecup relative to each other; and coupling the flexible shroud to a component of the interpupillary distance adjustment mechanism to form a seal over at least a portion of the interpupillary distance adjustment mechanism.

19. A method of adjusting an interpupillary distance of a head-mounted display assembly, the method comprising:
moving a first eyecup and a second eyecup relative to each other and relative to a single near-eye display screen over which the first eyecup and the second eyecup are mounted; and
maintaining a hermetic seal between a common volume defined by a first interior volume of the first eyecup, a second interior volume of the second eyecup, and the single near-eye display screen with a flexible shroud, wherein the flexible shroud is positioned at least partially within the first interior volume of the first eyecup and the second interior volume of the second eyecup.

\* \* \* \* \*